United States Patent
Kim et al.

(10) Patent No.: US 11,812,041 B2
(45) Date of Patent: Nov. 7, 2023

(54) FAST MOTION ESTIMATION FOR HIERARCHICAL CODING STRUCTURES

(71) Applicant: TEXAS INSTRUMENTS INCORPORATED, Dallas, TX (US)

(72) Inventors: Hyung Joon Kim, McKinney, TX (US); Minhua Zhou, Plano, TX (US); Akira Osamoto, Plano, TX (US); Hideo Tamama, The Colony, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/560,703

(22) Filed: Dec. 23, 2021

(65) Prior Publication Data
US 2022/0116604 A1  Apr. 14, 2022

Related U.S. Application Data

(63) Continuation of application No. 13/548,100, filed on Jul. 12, 2012, now Pat. No. 11,245,912.
(Continued)

(51) Int. Cl.
*H04N 19/192* (2014.01)
*H04N 19/119* (2014.01)
(Continued)

(52) U.S. Cl.
CPC ......... *H04N 19/192* (2014.11); *H04N 19/107* (2014.11); *H04N 19/119* (2014.11);
(Continued)

(58) Field of Classification Search
CPC .......................... H04N 19/192; H04N 19/176
See application file for complete search history.

(56) References Cited

U.S. PATENT DOCUMENTS

| | | |
|---|---|---|
| 6,108,039 A | 8/2000 | Linzer et al. |
| 6,208,692 B1 | 3/2001 | Song et al. |

(Continued)

OTHER PUBLICATIONS

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-259, Nov. 21-30, 2011, Geneva, Switzerland.
(Continued)

*Primary Examiner* — Jerry T Jean Baptiste
(74) *Attorney, Agent, or Firm* — Carl G. Peterson; Frank D. Cimino

(57) ABSTRACT

A method for motion estimation is provided that includes determining a first motion vector for a first child coding unit (CU) of a parent CU and a second motion vector for a second child CU of the parent CU, wherein the first child CU, the second child CU, and the parent CU are in a CU hierarchy, wherein the first and second child CUs are smallest size CUs in the CU hierarchy, and wherein a first motion search type is used to determine the first motion vector and the second motion vector, selecting the first and second motion vectors as candidate predictors for the parent CU, selecting a predictor for a prediction unit (PU) of the first parent CU from the candidate predictors, and refining the predictor using a second motion search type to determine a motion vector for the PU.

20 Claims, 8 Drawing Sheets

Related U.S. Application Data

(60) Provisional application No. 61/506,838, filed on Jul. 12, 2011.

(51) Int. Cl.

| | | |
|---|---|---|
| *H04N 19/147* | (2014.01) | |
| *H04N 19/176* | (2014.01) | |
| *H04N 19/51* | (2014.01) | |
| *H04N 19/593* | (2014.01) | |
| *H04N 19/107* | (2014.01) | |
| *H04N 19/169* | (2014.01) | |
| *H04N 19/52* | (2014.01) | |
| *H04N 19/103* | (2014.01) | |

(52) U.S. Cl.
CPC ......... *H04N 19/147* (2014.11); *H04N 19/176* (2014.11); *H04N 19/1883* (2014.11); *H04N 19/51* (2014.11); *H04N 19/52* (2014.11); *H04N 19/593* (2014.11); *H04N 19/103* (2014.11)

(56) References Cited

U.S. PATENT DOCUMENTS

| | | | |
|---|---|---|---|
| 2003/0156644 | A1 | 8/2003 | Song et al. |
| 2005/0013498 | A1 | 1/2005 | Srinivasan et al. |
| 2006/0233253 | A1 | 10/2006 | Shi et al. |
| 2007/0064803 | A1 | 3/2007 | Miao et al. |
| 2007/0183500 | A1 | 8/2007 | Nagaraj et al. |
| 2008/0144716 | A1 | 6/2008 | De Haan |
| 2008/0159402 | A1 | 7/2008 | Chen et al. |
| 2010/0086030 | A1* | 4/2010 | Chen .................. H04N 19/147 375/E7.243 |
| 2011/0051811 | A1* | 3/2011 | Wang .................. H04N 19/11 375/E7.243 |
| 2011/0170596 | A1 | 7/2011 | Shi et al. |
| 2011/0310976 | A1* | 12/2011 | Wang .................. H04N 19/61 375/E7.176 |
| 2012/0114043 | A1 | 5/2012 | Lee et al. |
| 2012/0140832 | A1 | 6/2012 | Sjoberg et al. |
| 2012/0147961 | A1 | 6/2012 | Guo et al. |
| 2012/0224637 | A1 | 9/2012 | Sugio et al. |

OTHER PUBLICATIONS

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-237, Nov. 21-30, 2011, Geneva, Switzerland.

Benjamin Bross et al, "High Efficiency Video Coding (HEVC) Text Specification Draft 7" JCTVC-I1003_d1, Joint Collaborative Team on Video Coding (JCT-VC) of ITU-T SG16 WP3 and ISO/IEC JTC1/SC29/WG11, pp. 1-272, Apr. 27-May 7, 2012, Geneva, Switzerland.

"TMS320DM6467 Digital Media System-on-Chip", SPRS403G, Texas Instruments Incorporated, Dec. 2007, revised Oct. 2010, pp. 1-355.

Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.

Deepak Turaga and Mohamed Alkanhal, "Search Algorithms for Block-Matching in Motion Estimation," pp. 1-12, Spring, 1998, Carnegie Mellon University, Pittsburgh, PA, available at http://www.ece.cmu.edu/~ee899/project/deepak_mid.htm.

"Random Noise: Search Methods in Motion Estimation," pp. 1-5, Sep. 14, 2010, available at http://blog.weisu.org/2008/12/search-methods-in-motion-estimation.html.

* cited by examiner

| PU | 2Nx2N | 2NxN[1] | Nx2N[1] | NxN[2] | 2NxnU[1] | 2NxnD[1] | nLx2N[1] | nRx2N[1] |
|---|---|---|---|---|---|---|---|---|
| CU 64 | X | X | X | | X | X | X | X |
| CU 32 | X | X | X | | X | X | X | X |
| CU 16 | X | X | X | | X | X | X | X |
| CU 8 | X | | | X | | | | |

NOTE 1: THESE PU PARTITION TYPES ARE AVAILABLE ONLY FOR INTER-PREDICTED PUs
NOTE 2: NxN PU PARTITION IS AVAILABLE ONLY FOR SCU

FAST MOTION ESTIMATION FOR HIERARCHICAL CODING STRUCTURES

CROSS-REFERENCE TO RELATED APPLICATIONS

This application is a continuation of U.S. application Ser. No. 13/548,100 filed Jul. 12, 2012, which claims benefit of U.S. Provisional Patent Application Ser. No. 61/506,838, filed Jul. 12, 2011, both of which are incorporated herein by reference in its entirety. This application is related to U.S. patent application Ser. No. 13/548,085 filed Jul. 12, 2012, U.S. Pat. No. 10,440,373, filed Jul. 12, 2012.

BACKGROUND OF THE INVENTION

Field of the Invention

Embodiments of the present invention generally relate to fast motion estimation for hierarchical coding structures in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. To address these requirements, HEVC utilizes larger block sizes than the current video coding standard, H.264/AVC. More specifically, in HEVC, a largest coding unit (LCU) is the base unit used for block-based coding. An LCU plays a similar role in coding as the 16×16 macroblock of H.264/AVC, but it may be larger, e.g., 32×32, 64×64, etc.

In HEVC, a picture is divided into non-overlapping LCUs. As used herein, the term "picture" may refer to a frame or a field of a frame. A frame is a complete image captured during a known time interval. To maximize coding efficiency, an LCU may be partitioned into coding units (CU) of different sizes using recursive quadtree partitioning. The quadtree is split according to various criteria until a leaf is reached, which is referred to as a coding unit (CU). The maximum hierarchical depth of the quadtree is determined by the size of the smallest CU (SCU) permitted. A CU is the root node of two trees, a prediction tree and a transform tree. A CU may be inter-predicted or intra-predicted.

A prediction tree specifies the position and size of prediction units (PU) for a coding unit. A prediction unit may not be larger than a coding unit and other size restrictions depend upon whether a CU is inter-predicted or intra-predicted. A transform tree specifies the position and size of transform units (TU) for a coding unit. A transform unit may not be larger than a coding unit and the size of a transform unit may be, for example, 4×4, 8×8, 16×16, 32×32, 4×16, 16×4, 8×32, and 32×8. The quadtree partitioning of an LCU into CUs and the sizes of the transforms units and prediction units for a CU are determined by a video encoder during prediction based on minimization of rate/distortion costs. The LCU size, the SCU size, and the partitioning signaled in the sequence parameter set (SPS) of an encoded bit stream.

SUMMARY

Embodiments of the present invention relate to methods, apparatus, and computer readable media for fast motion estimation in hierarchical coding structures. In one aspect, a method for motion estimation is provided that includes determining a first motion vector for a first child coding unit (CU) of a first parent CU and a second motion vector for a second child CU of the first parent CU, wherein the first child CU, the second child CU, and the first parent CU are in a CU hierarchy of a largest coding unit (LCU), wherein the first and second child CUs are CUs of a smallest size in the CU hierarchy, and wherein a first motion search type is used to determine the first motion vector and the second motion vector, selecting the first and second motion vectors as first and second candidate predictors for the first parent CU, selecting a first predictor for a prediction unit (PU) of the first parent CU, wherein the first predictor is one of the first and second candidate predictors, and refining the first predictor using a second motion search type to determine a motion vector for the PU.

In one aspect, a digital system including a video encoder configured to perform a method for motion estimation during encoding of a video stream is provided. The method includes determining a first motion vector for a first child coding unit (CU) of a first parent CU and a second motion vector for a second child CU of the first parent CU, wherein the first child CU, the second child CU, and the first parent CU are in a CU hierarchy of a largest coding unit (LCU), wherein the first and second child CUs are CUs of a smallest size in the CU hierarchy, and wherein a first motion search type is used to determine the first motion vector and the second motion vector, selecting the first and second motion vectors as first and second candidate predictors for the first parent CU, selecting a first predictor for a prediction unit (PU) of the first parent CU, wherein the first predictor is one of the first and second candidate predictors, and refining the first predictor using a second motion search type to determine a motion vector for the PU.

In one aspect, a computer readable medium is provided that stores software instructions that when executed in a digital system cause the digital system to perform a method for motion estimation as part of encoding a video stream. The method includes determining a first motion vector for a first child coding unit (CU) of a first parent CU and a second motion vector for a second child CU of the first parent CU, wherein the first child CU, the second child CU, and the first parent CU are in a CU hierarchy of a largest coding unit (LCU), wherein the first and second child CUs are CUs of a smallest size in the CU hierarchy, and wherein a first motion search type is used to determine the first motion vector and the second motion vector, selecting the first and second motion vectors as first and second candidate predictors for the first parent CU, selecting a first predictor for a prediction unit (PU) of the first parent CU, wherein the first predictor is one of the first and second candidate predictors, and refining the first predictor using a second motion search type to determine a motion vector for the PU.

BRIEF DESCRIPTION OF THE DRAWINGS

Particular embodiments will now be described, by way of example only, and with reference to the accompanying drawings:

FIG. 5 illustrates a method for context selection;

DETAILED DESCRIPTION OF EMBODIMENTS OF THE INVENTION

Figure 3:
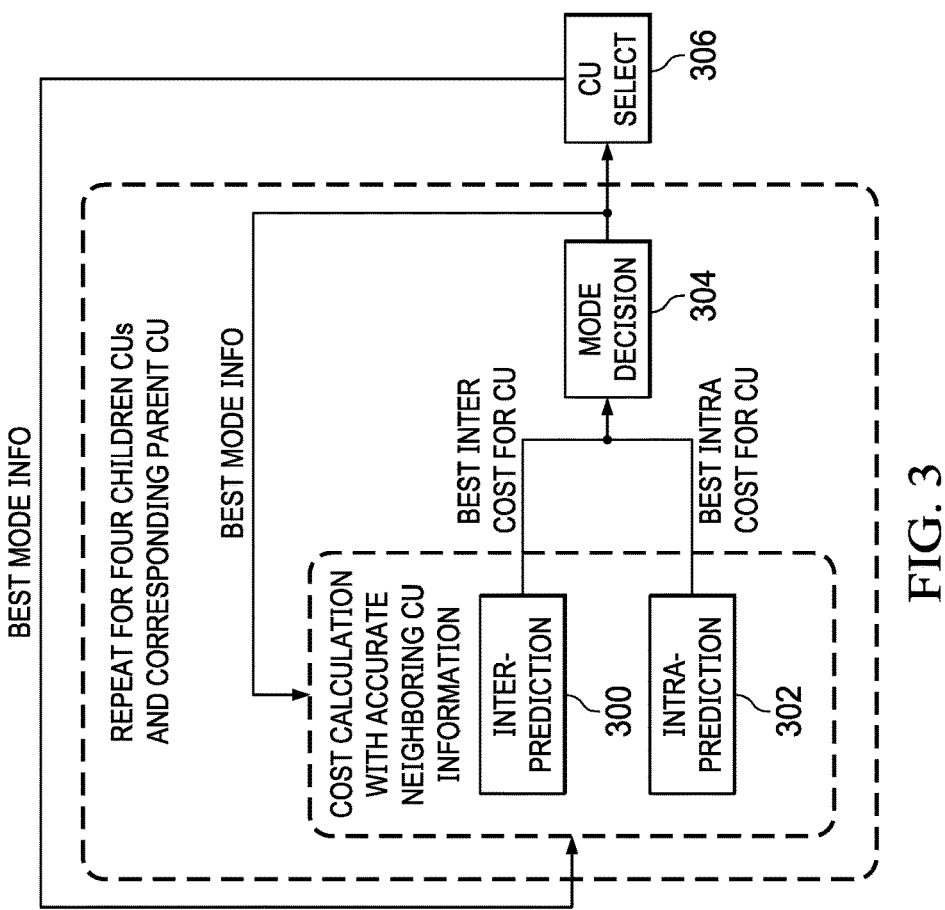
FIG. 3 is a block diagram illustrating CU partitioning in which motion estimation and intra-prediction communicate at the CU level.

Specific embodiments of the invention will now be described in detail with reference to the accompanying figures. Like elements in the various figures are denoted by like reference numerals for consistency.

For convenience of description, one or more embodiments are described herein in reference to HEVC and use terminology from HEVC. One of ordinary skill in the art will understand that embodiments are not limited to HEVC. Further, as is well known, a block of video data may include both luma data and chroma data, which may be encoded separately. While embodiments are described herein without distinguishing between luma and chroma, one of ordinary skill in the art will understand that the embodiments apply to both luma and chroma data encoding.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), and B. Bross, et al., "High Efficiency Video Coding (HEVC) Text Specification Draft 7," JCTVC-11003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7").

Figure 1:
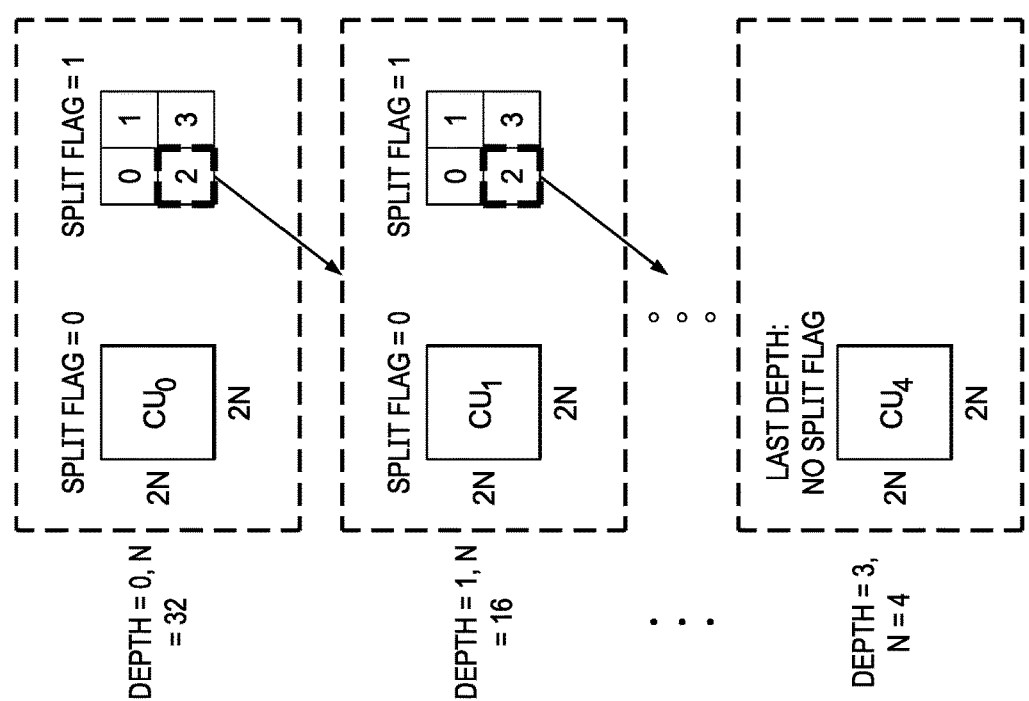
FIG. 1 illustrates quadtree partitioning of a largest coding unit.

As was previously described, in HEVC, a picture is divided into largest coding units (LCUs) and each LCU may be further divided into a hierarchy of coding units (CUs). The coding unit partitioning is based on a quadtree. FIG. 1 shows an example of CU partitioning in which the LCU size is 64×64 and maximum hierarchical depth is 4. The recursive structure, i.e., the partitioning, is represented by a series of split flags. For $CU_d$, which has depth d and size 2N×2N, the coding of the CU is performed in the current depth when split flag is set to zero. When the split flag is set to 1, $CU_d$ is split into 4 independent $CU_{d+1}$ which have depth (d+1) and size N×N. In this case, $CU_{d+1}$ is called a sub-CU of $CU_d$ similar to a sub-macroblock in H.264/AVC. Unless the depth of sub-CU (d+1) is equal to the maximum allowed depth, each $CU_{d+1}$ is processed in a recursive manner. If the depth of sub-CU (d+1) is equal to the maximum allowed depth, further splitting is not allowed. For coding, a CU can be further split into PUs and TUs.

The sizes of LCU and SCU are specified in the Sequence Parameter Set (SPS). The embedded information in the SPS is LCU size (s) and the maximum hierarchical depth (h) in a LCU. For example, if s=64 and h=4, then 4 kinds of CU sizes are possible: 64×64 (LCU), 32×32, 16×16 and 8×8 (SCU). If s=16 and h=2, then 16×16 (LCU) and 8×8 (SCU) are possible; this is a similar block structure to H.264/AVC.

Figure 2:
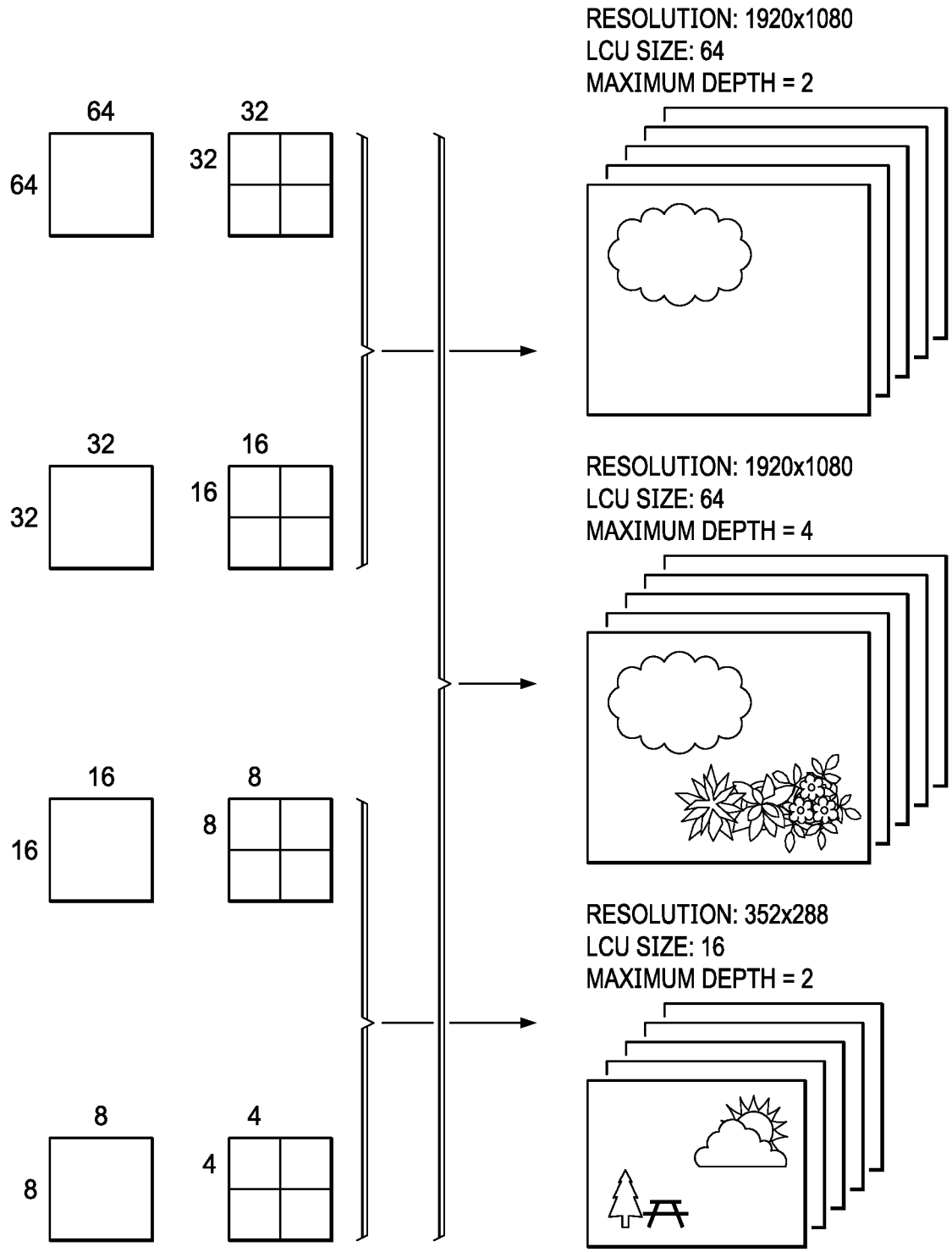
FIG. 2 shows examples of coding unit (CU) size combinations for several video resolutions.

This hierarchical coding unit representation provides several major benefits. When the region of interest in a picture is homogeneous, a large CU can represent the region in a smaller number of symbols than would be possible if several small blocks are used. In addition, supporting configurable LCU sizes enables a codec to be readily optimized for various content, applications and devices. For example, choosing an appropriate LCU size and maximum hierarchical depth allows the hierarchical block structure to be optimized for a targeted application. FIG. 2 shows examples of CU size combinations for several resolutions.

Figures 4A, 4B, 4C:
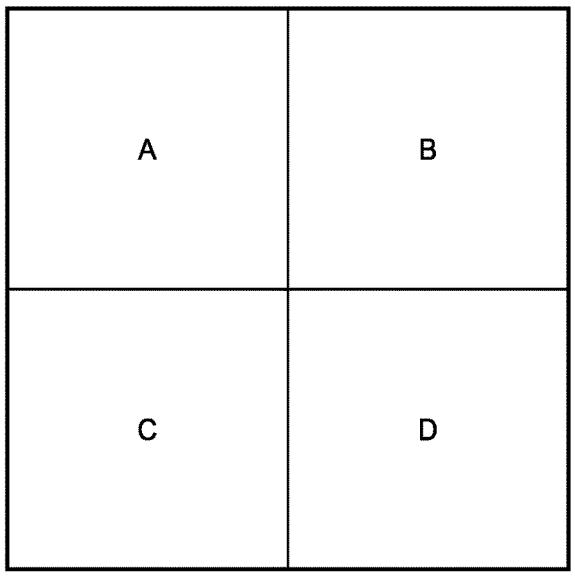
FIGS. 4A-4C and 5 are examples.

In some codecs, the partitioning of LCUs into CUs is decided based on coding costs determined by intra-prediction and intra-prediction in which information is shared between inter-prediction and intra-prediction at the CU level. FIG. 3 shows a block diagram illustrating CU partitioning and mode selection in such a codec. This example assumes that the portioning process is performed bottom up, i.e., starting with the smallest possible CU partitioning and working up the hierarchy levels. For simplicity of explanation, a 64×64 LCU and a hierarchy depth of 4 is assumed. Thus, the smallest CU size is 8×8. FIGS. 4A-4C illustrate, respectively, the partitioning of a 64×64 LCU into 32×32 CUs, the 32×32 CUs into 16×16 CUs, and the 16×16 CUs into 8×8 CUs.

Figures 9, 10:
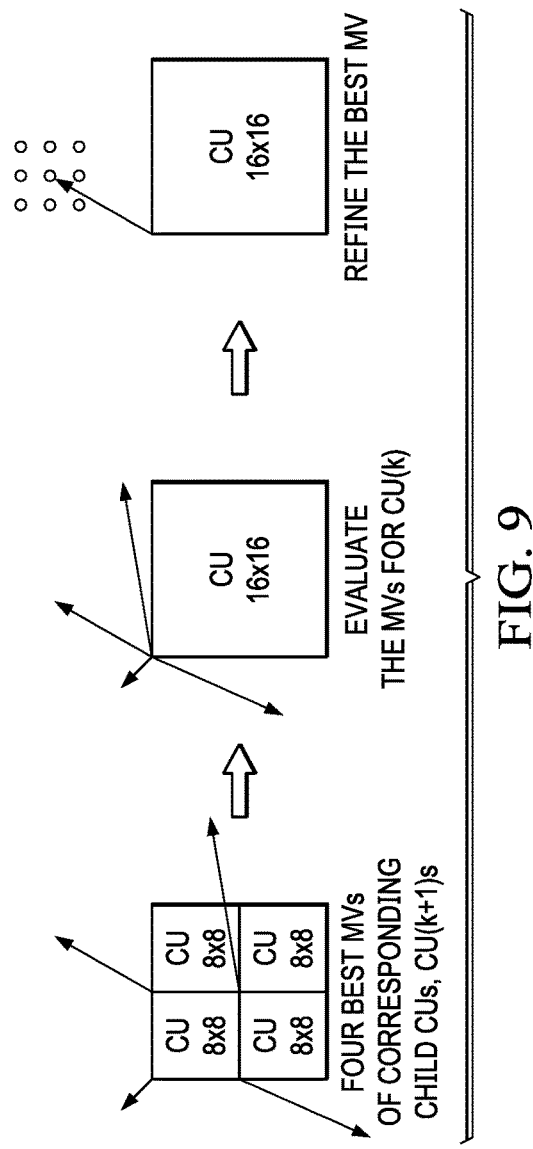
FIG. 9 is an example illustrating fast motion search for CU partitioning.
FIG. 10 shows the PU partition types for various CU sizes.

In general, the inter-prediction component 300 determines an inter-prediction coding cost for a CU, a best PU partition type for the CU, and an inter-prediction mode for each PU of the best PU partition type. To determine the best PU partition type and the inter-prediction modes for the PUs of the best PU partition type, the inter-prediction component 300 partitions the CU into PUs according to HEVC-specified PU partition types and performs tests each PU of a PU partition type according to a skip mode, a merge mode, and a normal inter-prediction mode to choose the best inter-prediction mode for each PU based on coding costs of these modes. Skip mode is a special case of merge mode in which the residual is not coded and will not be further described herein. FIG. 10 shows the different PU partition types specified in HEVC, e.g., HEVC Draft 7. Note that all PU partition types may not be used for all CU sizes. For example, the N×N PU partition type may only be used for the smallest CU size, i.e., 8×8.

After the best inter-prediction mode for each PU in a PU partition type is determined, the inter-prediction component 300 computes the coding cost for the PU partition type as the sum of the coding costs of the best inter-prediction modes of the PUs. After each specified PU partition type has been processed to determine the best inter-prediction modes of the PUs and the coding cost of the PU partition type, the inter-prediction component 300 selects the PU partition type with the smallest coding cost as the best PU partition type for the CU. The coding cost of the selected PU partition type is the inter-prediction coding cost for the CU.

More specifically, the inter-prediction component 300 processes a CU for each of the PU partition types specified for the particular CU size to determine the best PU partition type and the inter-prediction coding cost for the CU. As shown in FIG. 10, the PU partition types for inter-prediction of the smallest CU are 2N×2N, 2N×N, N×2N, and N×N and the PU partition types for inter-prediction of the larger CUs are 2N×2N, 2N×N, N×2N, 2N×nU, 2N×nD, nL×2N, and nR×2N. For the 2N×2N PU partition type, there is a single PU. To determine the best inter-prediction mode for the PU, the inter-prediction component 300 determines a coding cost of the PU for normal inter-prediction mode and a coding cost of the PU for merge mode. To determine the coding cost for normal inter-prediction mode, the inter-prediction component 300 performs a forward motion search and a backward motion search to determine the best forward motion vector and backward motion vector for the PU, i.e., to find a best matching block of the same size and shape as the PU in a forward reference picture and in a backward reference picture. A motion vector predictor (MVP) is also selected for the best forward motion vector and the best backward motion vector. Selection of an MVP for a motion vector is described in HEVC, e.g., HEVC Draft 7. The prediction direction, forward, backward, or bi-prediction, is selected based on the best forward motion vector and the best backward motion vector. The inter-prediction component 300 then computes a normal inter-prediction mode coding cost for the PU based on the motion vector(s) of the selected prediction direction.

The coding cost of a PU for normal inter-prediction mode may be computed as. SAD (or SATD)+$\lambda$*MVbits, where A is the Lagrangian multiplier, and MVbits is the number of bits for encoding the motion vector(s). SAD is the sum of absolute differences between the PU and the predicted PU, i.e., the best matching block in the reference picture. SATD is the sum of the absolute transform differences between the PU and the predicted PU. To compute SATD, first the residual block, i.e., the current PU minus the predicted PU, is created. Then, a Hadamard transform is applied to the residual block and the Hadamard transform coefficients are summed. The number of bits for motion vectors, MVbits, may be estimated as the difference between the PU motion vector(s) and the motion vector predictor(s).

In general, merge mode allows an inter-predicted PU to inherit a motion vector, prediction direction, and reference picture index from an inter-predicted PU which contains a motion data position selected from specified spatially neighboring motion data positions and temporally co-located motion data positions. To determine the coding cost of the PU for merge mode, the inter-prediction component 300 generates a merging candidate list from the spatially neighboring motion data positions and the temporally co-located motion data positions, and selects the best candidate from the list for merge mode. Construction of a merging candidate list for a PU is described in HEVC, e.g., HEVC Draft 7. The inter-prediction component 300 then computes a merge mode coding cost for the PU based on the selected merging candidate.

The coding cost of a PU for merge mode may be computed as SAD (or SATD)+$\lambda$*BitsForMergeCandidateIndex, where BitsForMergeCandidateIndex is the estimated number of bits needed to code the index of the selected merging candidate in the merging candidate list.

The inter-prediction component 300 then compares the merge mode coding cost for the PU and the normal inter-prediction coding cost for the PU and selects the mode with the lowest cost as the inter-prediction mode for the PU. The coding cost of the selected mode is the coding cost for the 2N×2N PU partition type.

For the 2N×2N, 2N×N, N×2N, 2N×nU, 2N×nD, nL×2N, and nR×2N PU partition types, there are two PUs, PU0 and PU1 (see FIG. 10). The inter-prediction component 300 determines a coding cost for each of these PU partition types as follows. To determine the best inter-prediction mode for PU0, the inter-prediction component 300 determines a coding cost of PU0 for normal inter-prediction mode and a coding cost of PU0 for merge mode in the same way as described above for the PU of the 2N×2N PU partition type. The inter-prediction component 300 then compares the merge mode coding cost for PU0 and the normal inter-prediction coding cost for PU0 and selects the mode with the lowest cost as the inter-prediction mode for PU0.

To determine the best inter-prediction mode for PU1, the inter-prediction component 300 determines a coding cost of PU1 for normal inter-prediction mode and a coding cost of PU1 for merge mode in the same way as described above for the PU of the 2N×2N PU partition type. The inter-prediction component 300 then compares the merge mode coding cost for PU1 and the normal inter-prediction coding cost for PU1 and selects the mode with the lowest cost as the inter-prediction mode for PU1.

Once the best inter-prediction mode is selected for PU0 and PU1, the inter-prediction component 300 sums the coding cost of the intra-prediction mode selected for PU0 and the coding cost of the inter-prediction mode selected for PU1 to determine the coding cost for the PU partition type.

For the N×N PU partition type, there are four PUs, PU0, PU1, PU2, and PU3 (see FIG. 10). To determine the best inter-prediction mode for each of these PUs, the inter-prediction component 300 determines a coding cost of the PU for normal inter-prediction mode and a coding cost of the PU for merge mode in the same way as described above for the PU of the 2N×2N PU partition type. The inter-prediction component 300 then compares the merge mode coding cost for the PU and the normal inter-prediction coding cost for the PU and selects the mode with the lowest cost as the inter-prediction mode for the PU.

Once the best inter-prediction mode is selected for each of PU0, PU1, PU2, and PU3, the inter-prediction component 300 sums the coding cost of the inter-prediction mode selected for PU0, the coding cost of the inter-prediction mode selected for PU1, the coding cost of the inter-prediction mode selected for PU2, and the coding cost of the inter-prediction mode selected for PU3 to determine the coding cost for the N×N partition type.

After coding costs are determined for the particular PU partition types to be considered for a CU, i.e., 2N×2N, 2N×N, N×2N, and N×N if the CU is the smallest CU size, 2N×2N, 2N×N, N×2N, 2N×nU, 2N×nD, nL×2N, and nR×2N if the CU is not the smallest CU size, the inter-prediction component 300 selects the PU partition type with the smallest coding cost as the PU partition type for the CU. The coding cost of the selected PU partition type is the inter-prediction coding cost for the CU. This inter-prediction coding cost, the selected PU partition type, and the interprediction modes selected for the PUs in the selected PU partition type are provided to the mode decision component 304.

In general, the intra-prediction component 302 performs tests on the same CU processed by the inter-prediction component 300 (either serially or in parallel) to determine an intra-prediction coding cost for the CU, a best PU partition type for the CU, and an intra-prediction mode for each PU of the best partition type. The particular intra-prediction modes to be considered are defined by HEVC. To determine the best PU partition type and the intra-prediction modes for the PUs of the best PU partition type, the intra-prediction component 302 partitions the CU into PUs according to HEVC-specified PU partition types for intra-prediction of a CU of the CU size. The intra-prediction component 302 performs tests on each PU of a PU partition type according to intra-prediction modes specified for the PU size and using data from previously encoded neighboring CUs to choose the best intra-prediction mode for each PU based on coding costs of these modes. In HEVC, e.g., HEVC Draft 7, there are thirty-five intra-prediction modes for each PU size. FIG. 10 shows the different PU partition types specified in HEVC, e.g., HEVC Draft 7. Note that for intra-prediction of a CU of the smallest size, only the 2N×2N and N×N partition types are used, and for the larger CU sizes, only the 2N×2N partition type is used.

After the best intra-prediction mode for each PU in a PU partition type is determined, the intra-prediction component 302 computes the coding cost for the PU partition type as the sum of the coding costs of the best intra-prediction modes of the PUs. After each specified PU partition type has been processed to determine the best intra-prediction modes of the PUs and the coding cost of the PU partition type, the intra-prediction component 302 selects the PU partition type with the smallest coding cost as the best PU partition type for the CU. The coding cost of the selected PU partition type is the intra-prediction coding cost for the CU.

More specifically, the intra-prediction component 302 processes the CU for each of the PU partition types specified for the particular CU size to determine the best PU partition type and the inter-prediction coding cost for the CU. As shown in FIG. 10, the PU partition types for inter-prediction of the smallest CU are 2N×2N and N×N and the sole PU partition type for intra-prediction of the larger CUs is 2N×2N. For the 2N×2N PU partition type, there is a single PU. To determine the best intra-prediction mode for the PU, the intra-prediction component 302 performs intra-prediction according to each intra-prediction mode specified for the PU size and determines a coding cost of the PU for the intra-prediction mode.

The intra-prediction component 302 then compares the coding costs of each intra-prediction mode and selects the intra-prediction mode with the lowest cost as the intra-prediction mode for the PU. The coding cost of the selected mode is the coding cost for the 2N×2N PU partition type. The coding cost of a PU for an intra-prediction mode may be computed as SAD (or SATD)+λ*PredModeBits, where PredModeBits is the estimated number of bits to code the prediction directions.

For the N×N PU partition type, there are four PUs, PU0, PU1, PU2, and PU3 (see FIG. 10). To determine the best intra-prediction mode for PU0, the intra-prediction component 302 performs intra-prediction according to each intra-prediction mode specified for the PU size and determines a coding cost of PU0 for the intra-prediction mode. The intra-prediction component 302 then compares the coding costs of each intra-prediction mode and selects the intra-prediction mode with the lowest cost as the intra-prediction mode for PU0. The intra-prediction component 302 determines intra-prediction modes for PU1, PU2, and PU3 in the same way as for PU0.

Once the best intra-prediction mode is selected for each of PU0, PU1, PU2, and PU3, the intra-prediction component 302 sums the coding cost of the intra-prediction mode selected for PU0, the coding cost of the intra-prediction mode selected for PU1, the coding cost of the intra-prediction mode selected for PU2, and the coding cost of the intra-prediction mode selected for PU3 to determine the coding cost for the N×N partition type.

After coding costs are determined for the particular PU partition types to be considered for the CU, i.e., 2N×2N and N×N if the CU is the smallest CU size and 2N×2N if the CU is not the smallest CU size, the intra-prediction component 302 selects the PU partition type with the smallest coding cost as the PU partition type for the CU. The coding cost of the selected PU partition type is the intra-prediction coding cost for the CU. This intra-prediction coding cost, the selected PU partition type, and the intra-prediction modes selected for the PUs in the selected PU partition type are provided to the mode decision component 304.

The mode decision 304 compares the intra-prediction coding cost and the inter-prediction coding cost for a CU and chooses the lowest cost prediction mode as the best prediction mode for the CU. Information regarding the best prediction mode is then provided to the inter-prediction component 300 and the intra-prediction component 302 for use in processing of subsequent CUs. The best mode information includes an indication of whether the CU is inter or intra-predicted. If the CU is intra-predicted, the best mode information may also include the intra-prediction modes for the PUs, the PU partitioning, and the CU intra-prediction coding cost. If the CU is inter-predicted, the best mode information may also include the inter-prediction modes of the PUs, the PU partitioning, the CU inter-prediction coding cost, and the motion vectors and reference indices for the PUs.

The best mode information is also provided to the CU selection component 306. For each four child CUs and the parent CU, the CU selection component 306 selects the best CU partition based on the summed coding costs of the four child CUs and the coding cost of the parent CU, i.e., the CU partition with the smallest coding cost is selected. The best mode information for the selected CU partition is provided to the inter-prediction component 300 and the intra-prediction component 302 for use in processing of subsequent CUs.

The operation of the system of FIG. 3 is now explained in more detail in reference to the example of FIGS. 4A-4C. Beginning with the smallest CU size, i.e., 8×8, inter-prediction coding costs and intra-prediction coding costs are determined for CUs A11, A12, A13, and A14. That is, CU A11 is processed by the inter-prediction component 300 to determine an inter-prediction cost and by the intra-prediction component 302 to determine an inter-prediction cost. The mode decision component 304 then selects the lowest cost prediction mode as the best prediction mode for CU A11. The best mode information is provided to the inter-prediction component 300 and the intra-prediction component 302 for use in processing of subsequent CUs. The best mode information is also provided to the CU selection component 306.

CUs A12, A13, and A14 are similarly processed to select the best prediction mode for each CU. The parent CU A1 is then processed in a similar fashion to select the best prediction mode. The CU selection component 306 then selects the CU partition by comparing the sum of the coding costs of the child CUs, A11, A12, A13, and A14, to the coding cost of the parent CU, A1, and choosing the partition with the least cost. The best mode information of the selected CU partition is provided to inter-prediction component 300 and the intra-prediction component 302 for use in processing subsequent CUs.

The parent CUs A2, A3, and A4 and their respective child CUs are similarly processed to select the best CU partitions and prediction mode(s) for the respective regions of the LCU. The parent of CUs A1, A2, A3, and A4, CU A, is then processed in a similar fashion to select the best prediction mode for that CU. The CU selection component 306 then selects the CU partition by comparing the sum of coding costs of the child CUs, A1, A2, A3, and A4, to the coding cost of the parent CU, CU A, and choosing the partition with the least cost.

Figure 5:
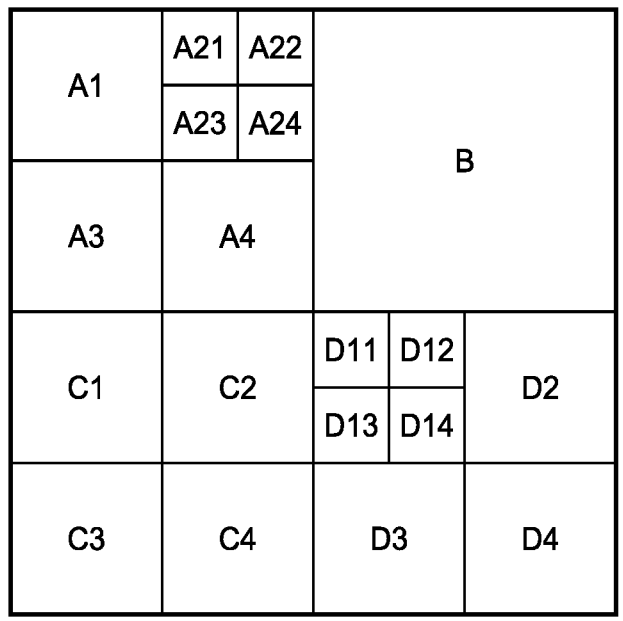

Note that at this point, the CU hierarchy for CU A may be the entire CU, the four 16×16 CUs, A1, A2, A3, and A4, the 16 8×8 CUs, A11-A44, or a combination of 16×16 and 8×8 CUs. For example, as shown in FIG. 5, the CU hierarchy for CU A may be as shown when the coding costs of CUs A1, A3, and A4 are better than the summed costs of their child CUs and the summed costs of the child CUs of CU A2 are better than the cost of their parent CU.

Referring again to FIGS. 4A-4C, CUs B, C, and D are processed in turn as described above to choose the best prediction modes and partitions beginning with the smallest CU size. As with CU A, the CU hierarchy for each of CUs B, C, and D may be the entire CU, the four 16×16 CUs, the 16 8×8 CUs, or a combination of 16×16 and 8×8 CUs. For example, as shown in FIG. 5, the CU hierarchy for CU B may be as shown when the coding cost of CU B is better than the summed coding cost of CUs B1, B2, B3, and B4. Further, the CU hierarchy for CU C may be as shown when the coding cost of each of the CUs C1, C2, C3, and C4 is better than the summed coding costs of their respective child CUs and the summed coding costs of these four CUs are better than the coding cost of CU B. In addition, the CU hierarchy for CU D may be as shown when the coding costs of CUs D2, D3, and D4 are better than the summed costs of their child CUs and the summed costs of the child CUs of CU D1 are better than the cost of their parent CU.

As a final step, the best prediction mode of the LCU is determined and the coding cost of this prediction mode is compared to the summed coding costs of CUs A, B, C, and D. If the coding cost of the LCU is better, then the LCU is coded according the best mode; otherwise, the LCU is coded according to the best modes/CU structures of CUs A, B, C, and D. Note that in determining the summed coding costs of CUs A, B, C, and D, the coding costs of the CUs in the hierarchy of each of these CUs is used. For example, in the example of FIG. 5, the coding cost of CU A is the summed coding costs of CUs A1, A21, A22, A23, A24, A3, and A4 and the coding cost of CU C is the summed coding costs of CUs C1, C2, C3, and C4.

Referring again to FIG. 3, this bottom-up CU selection process assumes that the inter-prediction component 300 and the intra-prediction component 302 modules are able to communicate at the CU level. Thus, the selected best mode/CU partition information for a given CU is immediately available to both modules for use in the next CU coding cost calculation. This CU level communication between motion estimation and intra-prediction enables upper-bound encoding performance through the use of accurate neighboring information at each level. However, this bottom-up approach with communication between motion estimation and intra-prediction at the CU level is complex and requires significant bandwidth to meet coded throughput requirements. Further, this approach may not be suitable for pipelined architectures that process many LCUs in parallel.

For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial. If inter-prediction and intra-prediction are performed by different slave processing modules at the LCU level, the CU level communication of the above described bottom up approach may not be feasible.

Further, motion estimation is one of the most time consuming parts of the CU partitioning process. As can be seen from the above description of bottom up CU partitioning, motion estimation is performed for each CU at each level in the CU hierarchy. That is, motion estimation is performed for each of the PUs of each specified PU partitioning of a CU.

Some embodiments of the invention provide for CU partitioning in which motion estimation and intra-prediction communicate at the LCU level instead of the CU level. More specifically, intra-prediction is performed for all CUs at all hierarchy levels in an LCU. The intra-prediction is performed bottom up with the assumption that all of the CUs are intra-predicted. The best intra-prediction mode and coding cost for each CU at each hierarchy level are stored for use in inter-prediction, mode selection, and CU partition selection. Inter-prediction, mode selection, and CU partition selection are then performed bottom up on the LCU using the stored intra-prediction information to determine the CU partitioning for encoding. While the prediction accuracy may be somewhat degraded due to the lack of accurate CU level neighboring information during intra-prediction, the minimal loss in accuracy may be acceptable given the increase in throughput and the ability to implement on LCU-based pipeline architectures.

Some embodiments of the invention provide simplified, faster motion estimation during CU partitioning. In general, the faster motion estimation may use a more complex motion search technique for the smallest CUs at the lowest hierarchy level, and a simpler motion search technique based on motion vectors of children CUs for CUs at higher levels, i.e., parent CUs, in the hierarchy. For a (forward or backward) motion search for a PU in a parent CU, a (forward or backward) predictor is selected from the best (forward or backward) motion vectors from the child CUs. These (forward or backward) motion vectors are the best (forward or backward) motion vectors generated for normal inter-prediction mode of each child CU. The (forward or backward) predictor is then refined using a simple search technique, e.g., a one step search in which eight neighboring positions around the (forward or backward) predictor are evaluated, to determine the (forward or backward) motion vector for the PU.

Figure 6:
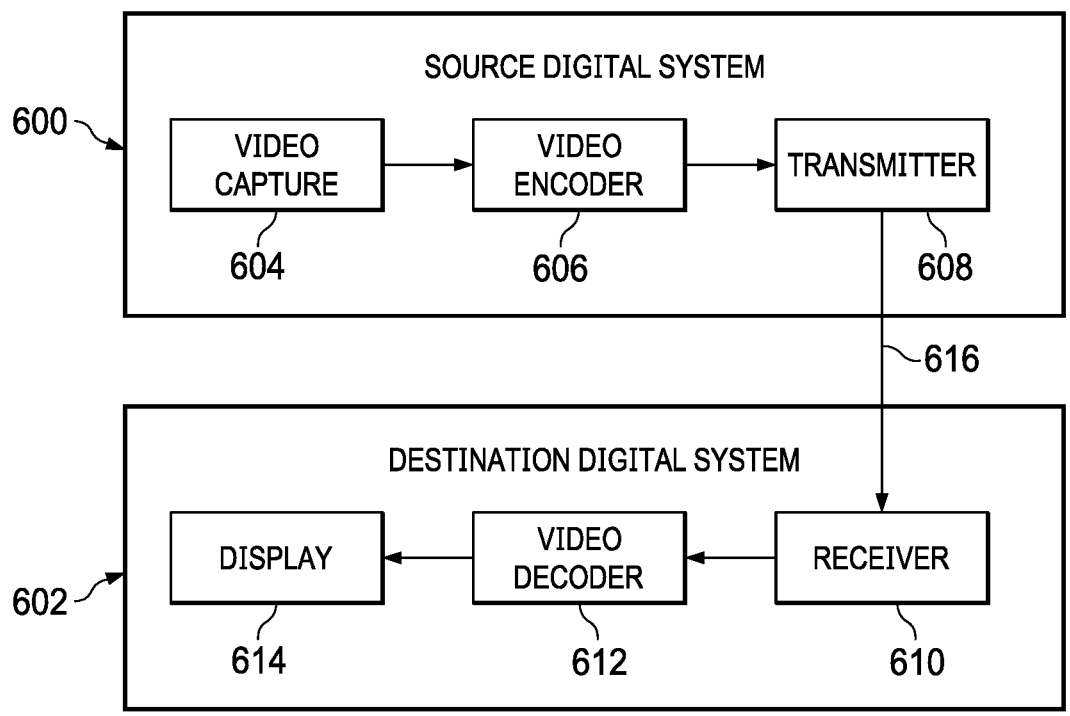
FIG. 6 is a block diagram of a digital system.

FIG. 6 shows a block diagram of a digital system that includes a source digital system 600 that transmits encoded video sequences to a destination digital system 602 via a communication channel 616. The source digital system 600 includes a video capture component 604, a video encoder component 606, and a transmitter component 608. The video capture component 604 is configured to provide a video sequence to be encoded by the video encoder component 606. The video capture component 604 may be, for example, a video camera, a video archive, or a video feed from a video content provider. In some embodiments, the video capture component 604 may generate computer graphics as the video sequence, or a combination of live video, archived video, and/or computer-generated video.

The video encoder component 606 receives a video sequence from the video capture component 604 and encodes it for transmission by the transmitter component 608. The video encoder component 606 receives the video sequence from the video capture component 604 as a sequence of pictures, divides the pictures into largest coding units (LCUs), and encodes the video data in the LCUs. The video encoder component 606 may be configured to perform coding unit partitioning as described herein during the encoding process. In some embodiments, a fast motion estimation technique as described herein may be used in the coding unit partitioning. An embodiment of the video encoder component 606 is described in more detail herein in reference to FIG. 7.

The transmitter component 608 transmits the encoded video data to the destination digital system 602 via the communication channel 616. The communication channel 616 may be any communication medium, or combination of communication media suitable for transmission of the encoded video sequence, such as, for example, wired or wireless communication media, a local area network, or a wide area network.

The destination digital system 602 includes a receiver component 610, a video decoder component 612 and a display component 614. The receiver component 610 receives the encoded video data from the source digital system 600 via the communication channel 616 and provides the encoded video data to the video decoder component 612 for decoding. The video decoder component 612 reverses the encoding process performed by the video encoder component 606 to reconstruct the LCUs of the video sequence.

The reconstructed video sequence is displayed on the display component 614. The display component 614 may be any suitable display device such as, for example, a plasma display, a liquid crystal display (LCD), a light emitting diode (LED) display, etc.

In some embodiments, the source digital system 600 may also include a receiver component and a video decoder component and/or the destination digital system 602 may include a transmitter component and a video encoder component for transmission of video sequences both directions for video steaming, video broadcasting, and video telephony. Further, the video encoder component 606 and the video decoder component 612 may perform encoding and decoding in accordance with one or more video compression standards. The video encoder component 606 and the video decoder component 612 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 7:
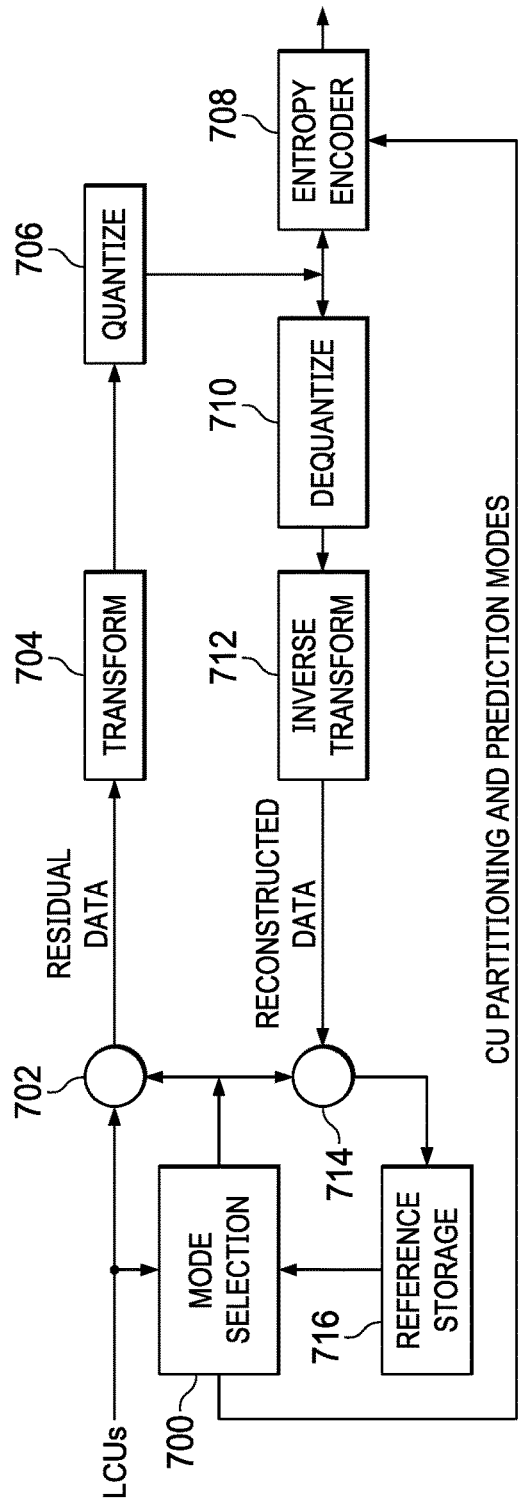
FIG. 7 is a block diagram of a video encoder.

FIG. 7 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which LCUs are processed concurrently in different components of the LCU processing, the coding control component controls the processing of LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different blocks of a picture at any given time. That is, the slave processing modules are executed in parallel, each processing its respective block while data movement from one processor to another is serial.

The LCU processing receives LCUs of the input video sequence from the coding control component and encodes the LCUs under the control of the coding control component to generate the compressed video stream. The LCUs from the coding control unit are provided as one input of a mode selection component 700 and to a positive input of a combiner 702 (e.g., adder or subtractor or the like). Further, although not specifically shown, the prediction mode of each picture as selected by the coding control component is provided to the mode selection component 700 and the entropy encoder 708.

The reference storage component 716 provides reference data to the mode selection component 700. The reference data may include one or more previously encoded and decoded CUs, i.e., reconstructed CUs.

The mode selection component 700 determines the CU partitioning, PU partitioning, TU partitioning, and prediction modes of an LCU. The operation of the mode selection component 700 is explained in reference to FIG. 8.

The predicted PUs from the mode selection component 700 are provided to a negative input of the combiner 702 and to a positive input of another combiner 714, e.g., an adder. The associated transform block sizes are also provided to the transform component 704. The combiner 702 subtracts each predicted PU from the original PU to provide residual PUs to the transform component 704. Each resulting residual PU is a set of pixel difference values that quantify differences between pixel values of the original PU and the predicted PU. The residual blocks of all the PUs of a CU form a residual CU block for the transform component 704.

The transform component 704 performs block transforms on the residual CU to convert the residual pixel values to transform coefficients and provides the transform coefficients to the quantize component 706. More specifically, the transform component 704 receives the transform block sizes for the residual CU from the mode selection component 700 and applies transforms of the specified sizes to the residual CU to generate transform coefficients.

The quantize component 706 quantizes the transform coefficients based on quantization parameters (QPs) and quantization matrices provided by the coding control component and the transform sizes. Although not specifically shown, the quantized transform coefficients are taken out of their scan ordering and arranged sequentially for entropy coding. In essence, the coefficients are scanned backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 708.

The entropy encoder 708 entropy encodes the relevant data, i.e., syntax elements, output by the various encoding components and the coding control component to generate the compressed video bit stream. The syntax elements are encoded according to the syntactical order specified in HEVC. This syntactical order specifies the order in which syntax elements should occur in a compressed video bit stream. Among the syntax elements that are encoded are the split flags indicating the CU partitioning of an LCU, the prediction modes for the CUs, and the transform coefficients for the CUs.

To determine the reconstructed input, i.e., reference data, needed by the mode selection component 700, the quantized transform coefficients for a CU are provided to a dequantize component 710, which outputs a reconstructed version of the transform result from the transform component 704.

The dequantized transform coefficients are provided to the inverse transform component 712, which outputs estimated residual information representing a reconstructed version of a residual CU. The inverse transform component 712 receives the transform block size used to generate the transform coefficients and applies inverse transform(s) of the specified size to the transform coefficients to reconstruct the residual values.

The reconstructed residual CU is provided to the combiner 714. The combiner 714 adds the predicted PUs of the CU from the mode selection component 700 to the reconstructed residual PUs of the CU to generate a reconstructed CU. The reconstructed CU is stored in reference storage 716 for use by the mode selection component 700.

Figure 8:
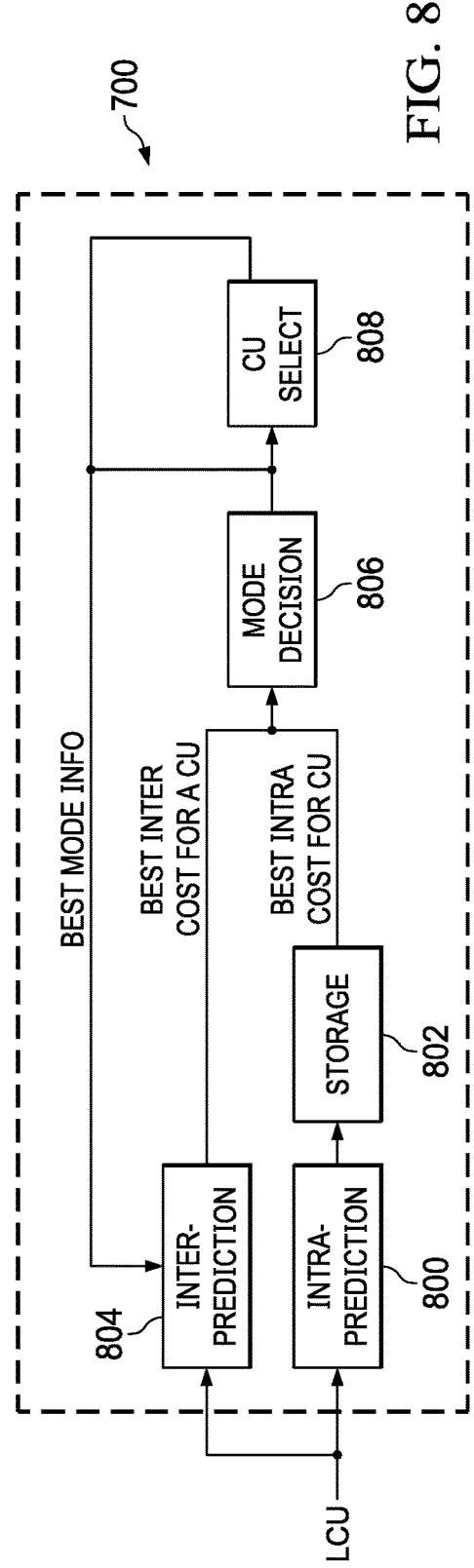
FIG. 8 is a block diagram of the mode selection component of the video encoder of FIG. 7.

FIG. 8 is a block diagram of the mode selection component 700. As previously described, the mode selection component 700 determines CU partitioning, PU partitioning, TU partitioning, and prediction modes for an LCU. For simplicity of explanation in the description below, a 64×64 LCU and a hierarchy depth of 4 is assumed. One of ordinary skill in the art will understand embodiments in which the LCU size and/or hierarchy depth differ from these assumptions. The TU partitioning is performed as specified by HEVC, e.g., HEVC Draft 7, and is not specifically described herein.

The mode selection component 700 includes an intra-prediction component 800, a storage component 802, an inter-prediction component 804, a mode decision component 806, and a CU selection component 808. Although not specifically shown, inherent in the mode selection component 700 is functionality to perform the transformation, quantization, dequantization, inverse transformation, and reconstruction needed to determine coding costs for intra-prediction and motion estimation.

The intra-prediction component 800 performs bottom-up processing on the LCU beginning with the smallest CU size to determine an intra-prediction coding cost, a best PU partition type, and an intra-prediction mode for each PU of the best PU partition type for each possible CU in the LCU hierarchy. The operation of the intra-prediction component 800 to determine an intra-prediction coding cost, a best PU partition type, and an intra-prediction mode for each PU of the best PU partition type for a CU is the same as that of the intra-prediction component 302 of FIG. 3 with the exception that previously encoded neighboring CUs used for testing of intra-prediction modes are all intra-predicted. In addition, rather than providing the intra-prediction coding cost, the selected PU partition type, and the intra-prediction modes selected for the PUs in the selected PU partition type for each CU directly to a mode decision component, this information is stored in the storage 802. Thus, after the LCU is processed by the intra-prediction component 800, an intra-prediction coding cost, a best PU partition type, and an intra-prediction mode for each PU of the best PU partition type for each possible CU in the LCU is stored in the storage 802.

The operation of the intra-prediction component 800 is now explained in more detail in reference to the example of FIGS. 4A-4C. Beginning with the smallest CU size, i.e., 8×8, an intra-prediction coding cost, a best PU partition type, and an intra-prediction mode for each PU of the best PU partition type are determined in turn for A11, A12, A13, and A14. Intra-prediction mode information for these CUs, e.g., the intra-prediction coding cost, the best PU partition type, and an intra-prediction mode for each PU of the best PU partition type is stored in the storage 802.

The parent CU A1 is then processed to determine an intra-prediction coding cost, a best PU partition type, and intra-prediction modes for the PUs of the best PU partition type for CU A1 and to store the intra-prediction mode information for CU A1 in the storage 802. The parent CUs A2, A3, and A4 and their respective child CUs are similarly processed to determine intra-prediction coding costs, best PU partition types, and intra-prediction modes for the PUs of the best PU partition types for the respective regions of the LCU, and to store the intra-prediction mode information for the CUs in the storage 802. The parent of CUs A1, A2, A3, and A4, CU A, is then processed to determine an intra-prediction coding cost, a best PU partition type, and intra-prediction modes for the PUs of the best PU partition type for CU A, and to store the intra-prediction mode information for CU A in the storage 802. Note that because there is a single PU partition type for CUs A1, A2, A3, A4, and A, i.e., the 2N×2N PU partition type, this PU partition type is the best PU partition type for these CUs by default.

Note that at this point, the intra-prediction mode information for CUs A11-A44, A1-A4, and A are stored in the storage 802. CUs B, C, and D are similarly processed in turn as described above to determine an intra-prediction coding cost, a best PU partition type, and intra-prediction modes for the PUs of the best PU partition type for each CU size starting with the smallest CUs, and to store the intra-prediction mode information for each of the CUs in the storage 802. As a final step, an intra-prediction coding cost, a best PU partition type, and an intra-prediction mode for the PUs of the best PU partition type is determined for the LCU as a whole, and the intra-prediction mode information for the LCU is stored in the storage 802. Thus, the intra-prediction mode information for each of the CUs of FIGS. 4A, 4B, and 4C as well as the intra-prediction mode information for the LCU as a whole are stored in the storage 802. Note that because there is a single PU partition type, i.e., the 2N×2N PU partition type, for CUs B, C, D, and their respective child CUs (except the smallest child CUs) and for the LCU, this PU partition type is the best PU partition type for those CUs and the LCU by default.

The inter-prediction component 804 performs inter-prediction on all possible CUs in an LCU. More specifically, the inter-prediction component 804 performs bottom-up processing on the LCU beginning with the smallest CU size to determine an inter-prediction coding cost, a best PU partition type, and an inter-prediction mode for each PU of the best PU partition type for all possible CUs in the LCU. The operation of the inter-prediction component 804 to determine an inter-prediction coding cost, a best PU partition type, and an inter-prediction mode for each PU of the best PU partition type is the same as that of the inter-prediction component 300 of FIG. 3. The inter-prediction coding cost, the best PU partition type, and the inter-prediction modes selected for the PUs of the best PU partition type are provided to the mode decision component 806.

The mode decision component 806 compares the intra-prediction coding cost and the inter-prediction coding cost for a CU and chooses the lowest cost prediction mode as the best prediction mode for the CU. For the comparison, the mode decision component 806 receives the inter-prediction coding cost for a CU from the inter-prediction component 804 and receives the intra-prediction coding cost for the CU from the storage 802. The best mode information for the selected prediction mode is then provided to the inter-prediction component 804 for use in processing of subsequent CUs. If intra-prediction mode is selected as the best prediction mode for the CU, the relevant intra-prediction information for the CU is retrieved from the storage 802. The best mode information is also provided to the CU selection component 808.

For each four child CUs and the parent CU, the CU selection component 808 selects the best CU partition based on the summed coding costs of the four child CUs and the coding cost of the parent CU, i.e., the partition with the lowest coding cost is selected. The best mode information for the selected CU partition is provided to the inter-prediction component 804 for use in processing of subsequent CUs.

The operation of the inter-prediction component 804, the mode decision component 806, and the CU selection component 808 is now explained in more detail in reference to the example of FIGS. 4A-4C. Beginning with the smallest CU size, i.e., 8×8, the inter-prediction component 804 determines an inter-prediction coding cost for CU A11. The mode decision component 806 then selects the best prediction mode for CU A11 based on the inter-prediction coding cost selected by the inter-prediction component 804 and the intra-prediction coding cost for CU A11 previously determined by the intra-prediction component 800 and stored in the storage 802. The best mode information is provided to the inter-prediction component 804 for use in processing of subsequent CUs. The best mode information is also provided to the CU selection component 808.

CUs A12, A13, and A14 are similarly processed to select the best prediction mode for each CU. The parent CU A1 is then processed in a similar fashion to select the best prediction mode. The CU selection component 808 then selects the CU partition by comparing the sum of coding costs of the child CUs, A11, A12, A13, and A14, to the coding cost of the parent CU, A1. The best mode information for the selected CU partition is provided to the inter-prediction component 804 for use in processing subsequent CUs.

The parent CUs A2, A3, and A4 and their respective child CUs are similarly processed to select the best CU partition and prediction mode(s) for the respective regions of the LCU. The parent of CUs A1, A2, A3, and A4, CU A, is then processed in a similar fashion to select the best prediction mode for CU A. The CU selection component 808 then selects the CU partition by comparing the sum of coding costs of the child CUs, A1, A2, A3, and A4, to the coding cost of the parent CU, CU A.

Note that at this point, the CU hierarchy for CU A may be the entire CU, the four 16×16 CUs, A1, A2, A3, and A4, the 16 8×8 CUs, A11-A44, or a combination of 16×16 and 8×8 CUs. For example, as shown in FIG. 5, the CU hierarchy for CU A may be as shown when the coding costs of CUs A1, A3, and A4 are better than the summed costs of their child CUs and the summed costs of the child CUs of CU A2 are better than the cost of their parent CU.

Referring again to FIGS. 4A-4C, CUs B, C, and D are processed in turn as described above to choose the best prediction modes and partition beginning with the smallest CU size. As with CU A, the CU hierarchy for each of CUs B, C, and D may be the entire CU, the four 16×16 CUs, the 16 8×8 CUs, or a combination of 16×16 and 8×8 CUs. For example, as shown in FIG. 5, the CU hierarchy for CU B may be as shown when the coding cost of CU B is better than the summed coding cost of CUs B1, B2, B3, and B4. Further, the CU hierarchy for CU C may be as shown when the coding cost of each of the CUs C1, C2, C3, and C4 is better than the summed coding costs of their respective child CUs and the summed coding costs of these four CUs are better than the coding cost of CU B. In addition, the CU hierarchy for CU D may be as shown when the coding costs of CUs D2, D3, and D4 are better than the summed costs of their child CUs and the summed coding costs of the child CUs of CU D1 are better than the cost of their parent CU.

As a final step, the best prediction mode of the LCU is determined and the coding cost of this prediction mode is compared to the summed coding costs of CUs A, B, C, and D. If the coding cost of the LCU is better, then the LCU is selected for coding; otherwise, the best modes/CU structures of CUs A, B, C, and D are selected for coding. More specifically, if the LCU level coding cost is best, the output of the mode selection component 700 is the PU structure and TU structure of the LCU best mode, the predicted PUs, and the prediction data for the PUs, e.g., prediction mode, prediction angle, motion vector(s), motion vector predictors, prediction direction, reference picture index (indices), etc. And, if the LCU level coding cost is not best, the output of the mode selection component 700 is the CU structure of CUs A, B, C, and D, the PU and TU structures of the best mode for each CU in the CU structure, the predicted PUs of each CU, and the prediction data for the PUs. For example, if the CU structure of CUs A, B, C, and D is that of FIG. 5, then PU and TU structures and predicted PUs generated when determining the best prediction mode for CUs A1, A21, A22, A23, A24, A3, A4, B, C1, C2, C3, C4, D11, D12, D13, D14, D2, D3, and D4 are output by the mode selection component 700.

Note that in determining the summed coding costs of CUs A, B, C, and D, the coding costs of the CUs in the hierarchy of each of these CUs is used. For example, in the example of FIG. 5, the coding cost of CU A is the summed coding costs of CUs A1, A21, A22, A23, A24, A3, and A4 and the coding cost of CU C is the summed coding costs of CUs C1, C2, C3, and C4.

In some embodiments, a fast motion estimation technique may be used by the inter-prediction component 804 to determine the best motion vectors for PUs in each CU. An overview of this technique is explained in reference to the example of FIG. 9. For simplicity of explanation, the PU partitioning of all CUs is assumed to be 2N×2N, i.e., PU=CU and only one prediction direction, i.e., forward prediction, is assumed. Let CU(n) denote a CU at level m in the CU hierarchy. The range of m is 0 to M−1, where M is the number of CU levels, and 0 and M−1 are the largest and smallest CU levels, respectively. To determine a motion vector for a parent CU(k) (k=0~M−2), the best four motion vectors of corresponding child CU(k+1)s are examined to select one of the motion vectors as a predictor for the parent CU(k). The selection may be made, for example, by computing the sum of absolute differences (SAD) between the CU(k) and the reference blocks indicated by each of the four motion vectors and selecting the motion vector with the best result. The selected predictor is then refined using a simple motion search, e.g., the previously mentioned one step search, to determine the motion vector for the parent CU(k).

For the smallest CU level, CU (k=M−1), a more complex motion search, e.g., a full search, is used to determine the motion vector. The complexity of the motion search used for the smallest CUs and the complexity of the motion search used to refine the predictor in the parent CUs may depend on the computational capability of the underlying hardware. For example, for systems with lower computational capability, the motion search at the smallest CU level may be a three step search and the motion search for refinement of the predictors at the higher CU levels may be the previously mentioned one step search. For systems with higher computational capability, the motion search at the smallest CU level may be a full motion search and the motion search for refinement of the predictors at the higher CU levels may be a three step search.

The use of the fast motion estimation technique in an embodiment of the intra-prediction component 804 is now described. As was previously described, the inter-prediction component 804 processes a CU for each of the PU partition types specified for the particular CU size to determine the best PU partition type and inter-prediction coding cost for the CU. To determine the best PU partition type, the inter-prediction component 804 determines an inter-prediction coding cost for each specified PU partition type. As part of determining the inter-prediction coding cost for a PU partition type, the inter-prediction component 804 determines a coding cost for each PU of the PU partition type for normal inter-prediction mode. To determine the coding cost of a PU for normal inter-prediction mode, the inter-prediction component 804 performs a forward motion search and a backward motion search to determine the best forward motion vector and backward motion vector for the PU, i.e., to find a best matching block of the same size and shape as the PU in a forward reference picture and in a backward reference picture. In an embodiment, the motion search technique used for the forward motion search and the backward motion search depends on whether the CU being processed is a CU of the smallest size, e.g., 8×8, or is a parent CU, i.e., a CU of one of the larger sizes, e.g., 16×16, 32×32, or 64×64.

If the CU being processed by the inter-prediction component 804 is of the smallest size, the inter-prediction component 804 uses a suitable motion search, e.g., a full motion search or a three step search, for the forward motion search and the backward motion search to determine the best forward motion vector and backward motion vector. Thus, for each specified PU partition type for a smallest CU, i.e., 2N×2N, 2N×N, N×2N, and N×N, a best forward motion vector and a best backward motion vector is determined for each PU of each PU partition type. For example, because there is only one PU in the 2N×2N PU partition type, a single best forward motion vector and a single best backward motion vector is determined. For the 2N×N and N×2N PU partition types, a best forward motion vector and a best backward motion vector is determined for PU0 and for PU1 (see FIG. 10). For the N×N PU partition type, a best forward motion vector and a best backward motion vector is determined for PU0, for PU1, for PU2, and for PU 3 (see FIG. 10).

Further, after the inter-prediction component 804 selects the best PU partition type for the CU, the inter-prediction component 804 selects the forward motion vector and the backward motion vector determined for PU0 (see FIG. 10) of this best PU partition type as candidate forward and backward predictors for the parent CU of the CU. Note that even if inter-prediction component 804 selects merge mode as the best inter-prediction mode for PU0 of the best PU partition type, the forward motion vector and the backward motion vector determined for PU0 can be used as these motion vectors were determined as part of determining the coding cost of PU0 for normal inter-prediction mode.

If the CU being processed by the inter-prediction component 804 is a parent CU, the inter-prediction component 804 uses a simplified motion search for the forward motion search and the backward motion search. First, the inter-prediction component 804 evaluates the four candidate forward predictors from the child CUs of the parent CU to select one as a forward predictor for the PU. The forward predictor may be determined by computing a SAD result for each candidate forward predictor and picking the candidate forward predictor with the best, i.e., lowest, SAD result. Other suitable evaluation techniques may also be used. The inter-prediction component 804 also similarly evaluates the four candidate backward predictors from the child CUs to select one as a backward predictor for the PU. The inter-prediction component 804 then refines the forward predictor and the backward predictor using a suitable simple motion search, e.g., a three step search or the previously mentioned one step search, to determine the forward motion vector and the backward motion vector for the PU.

Thus, for each specified PU partition type for a parent CU, i.e., 2N×2N, 2N×N, N×2N, 2N×nU, 2N×nD, nL×2N, and nR×2N, a best forward motion vector and a best backward motion vector is determined for each PU of each PU partition type. For example, because there is only one PU in the 2N×2N PU partition type, a single best forward motion vector and a single best backward motion vector is determined. For the other PU partition types, a best forward motion vector and a best backward motion vector is determined for PU0 and for PU1 (see FIG. 10).

Further, after the inter-prediction component 804 selects the best PU partition type for the parent CU, the inter-prediction component 804 selects the forward motion vector and the backward motion vector determined for PU0 (see FIG. 10) of this best PU partition type as candidate forward and backward predictors for the parent CU (if any) of the CU. Note that even if inter-prediction component 804 selects merge mode as the best inter-prediction mode for PU0 of the best PU partition type, the forward motion vector and the backward motion vector determined for PU0 can be used as these motion vectors were determined as part of determining the coding cost of PU0 for normal inter-prediction mode.

Three step searches and full motion searches are well known in the art. Examples of such searches are described in D. Turaga and M. Alkanhal, "Search Algorithms for Block-Matching in Motion Estimation," pp. 1-12, Spring, 1998, Carnegie Mellon University, Pittsburgh, Pa., available at http://www.ece.cmu.edu/~ee899/project/deepak_mid.htm and in "Random Noise: Search Methods in Motion Estimation," pp. 1-5, Sep. 14, 2010, available at http://blog-.weisu.org/2008/12/search-methods-in-motion-estimation-.html. Examples of other suitable motion search techniques that may be used in embodiments are also described in these documents.

Figure 11:
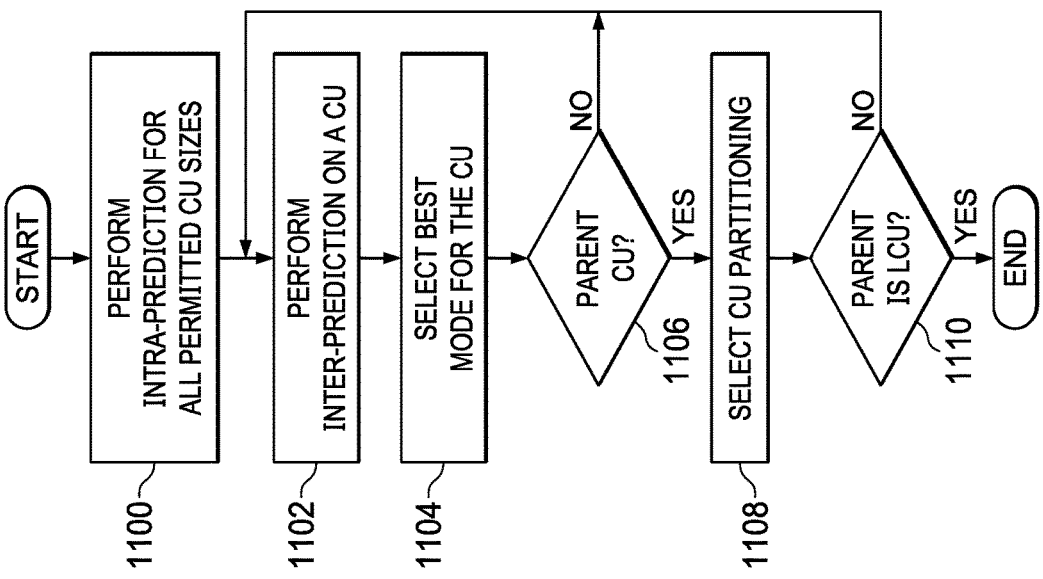
FIG. 11 is a flow diagram of a method for CU partitioning.

FIG. 11 is a flow diagram of a method for CU partitioning of an LCU that may be performed in an encoder. Initially, intra-prediction is performed 1100 on the LCU for all permitted CU sizes. The permitted CU sizes may be derived from a predetermined LCU size and a predetermined maximum CU hierarchy depth. The intra-prediction is performed bottom up beginning with the smallest permitted CU size and an intra-prediction coding cost, a best PU partition type, and an intra-prediction mode for each PU of the best PU partition type is determined for each CU. The intra-prediction coding cost, a best PU partition type, and the intra-prediction modes for the PUs of the best PU partition type for all of the CUs are stored in memory for use in selecting the actual coding structure for the LCU. Bottom up intra-prediction of all permitted CU sizes is previously described in more detail herein.

Bottom up inter-prediction, mode selection, and CU partition selection is then performed 1102-1110 on the LCU to determine the CU partitioning for encoding. Beginning with the smallest permitted CU size, inter-prediction is performed 1102 on a CU to determine an inter-prediction coding cost for the CU. The best prediction mode for the CU is then selected 1104 based on the inter-prediction coding cost and the intra-prediction coding cost determined for the CU during intra-prediction. The intra-prediction coding cost for the CU is read from the memory where the data was stored during intra-prediction processing of the LCU.

If the current CU is not a parent CU 1106, processing continues with the next child CU. If the current CU is a parent CU 1106, then a CU partition is selected for the parent CU. This selection is made by comparing the summed coding costs of the child CUs to the coding cost of the parent CU, and selecting the CU partition with the smallest coding cost. Processing continues with the next CU unless the parent CU is the LCU 1110. The bottom up inter-prediction, mode selection, and CU partition selection is previously described in more detail herein.

Figure 12:
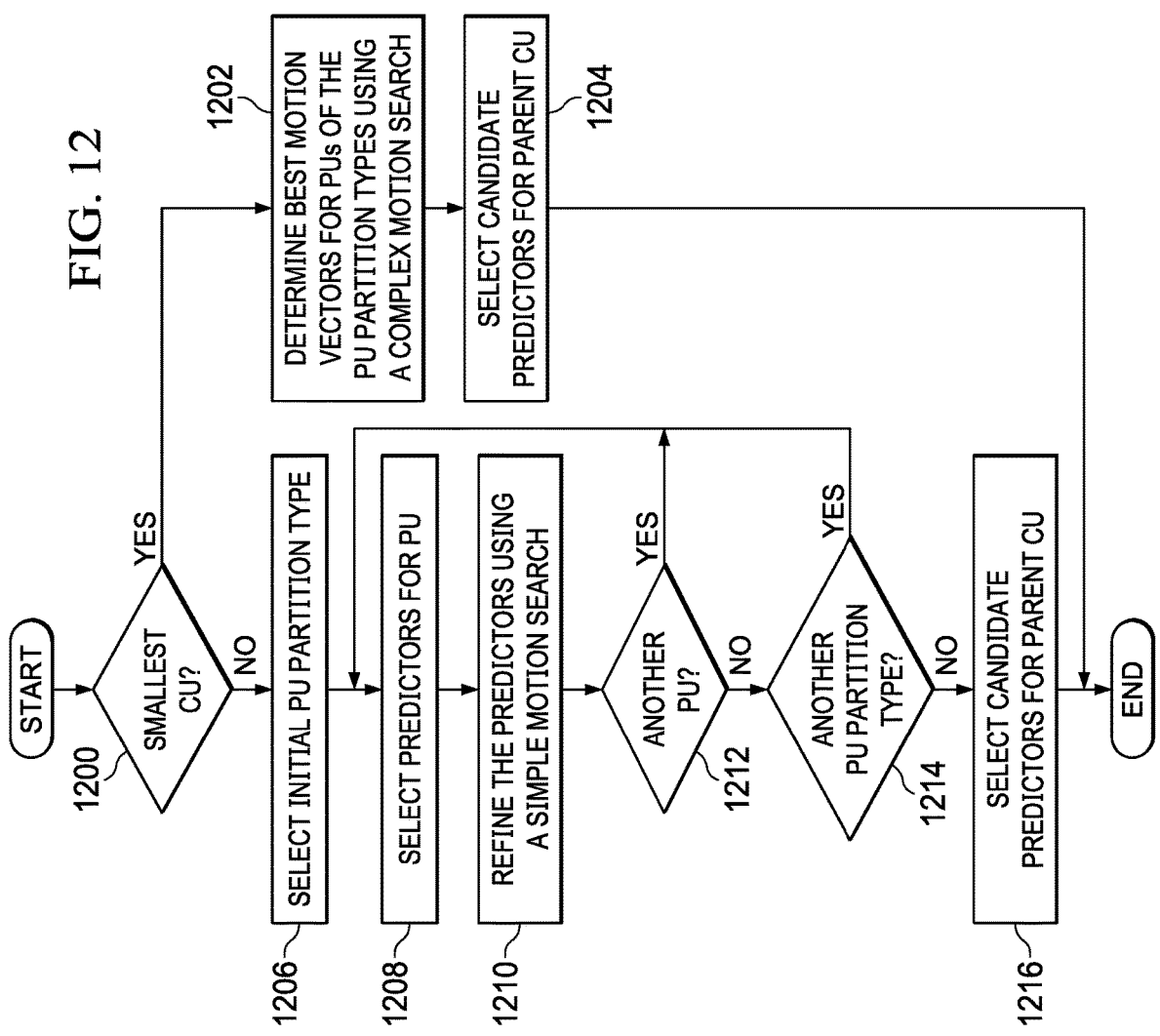
FIG. 12 is a flow diagram of a method for fast motion search.

FIG. 12 is a flow diagram of a method for fast motion estimation in bottom up CU partitioning. This method may be performed for each CU to determine the best motion vectors for PUs. If the CU is a CU of the smallest size 1200 in the CU hierarchy, then the best forward and backward motion vectors for each of the PUs of each of the PU partition types specified for the smallest CU size (see FIG. 10) are determined 1202 using a suitable motion search, e.g., a full motion search or a three step search. A candidate forward predictor and a candidate backward predictor for the parent CU is also selected 1204. Selection of candidate forward and backward predictors when a CU is of the smallest size is previously described herein.

If the CU is not a CU of the smallest size 1200, i.e., the CU is a parent CU, one of the specified PU partition types for the parent CU size (see FIG. 10) is selected 1206 for motion vector determination. Any of the specified PU partition types may be selected as the initial PU partition type. Predictors, i.e., a forward predictor and a backward predictor, are then selected 1208 for a PU of the current PU partition type from the four candidate forward predictors and the four candidate backward predictors of the child CUs. That is, the four candidate forward predictors and the four candidate backward predictors are evaluated to select the best forward predictor and backward predictor for the PU. The forward predictor may be determined by computing a SAD result for each candidate forward predictor and picking the candidate forward predictor with the best, i.e., lowest, SAD result. Other suitable evaluation techniques may also be used. The four candidate backward predictors from the child CUs are also similarly evaluated to select one as a backward predictor for the PU.

The selected predictors are then refined 1210 to determine a forward motion vector and backward motion vector for the PU. The refinement is performed using a suitable motion search technique, e.g., a motion search technique of less complexity than the one used for determining the motion vectors of the smallest CUs. Examples of such motion search techniques include a three step search and the previously mentioned one step search.

The selection of predictors and the refining of the selected predictors is repeated for each PU in the current PU partition type 1212. Once forward and backward motion vectors are determined for all PUs of the current PU partition type 1212, the steps 1208-1210 are repeated for the next PU partition type, if any 1214. Once forward and backward motion vectors have been determined for all PUs of all PU partition types, candidate predictors are selected for the parent CU, if the CU has a parent. Selection of candidate forward and backward predictors when a CU is a parent CU is previously described herein.

Figure 13:
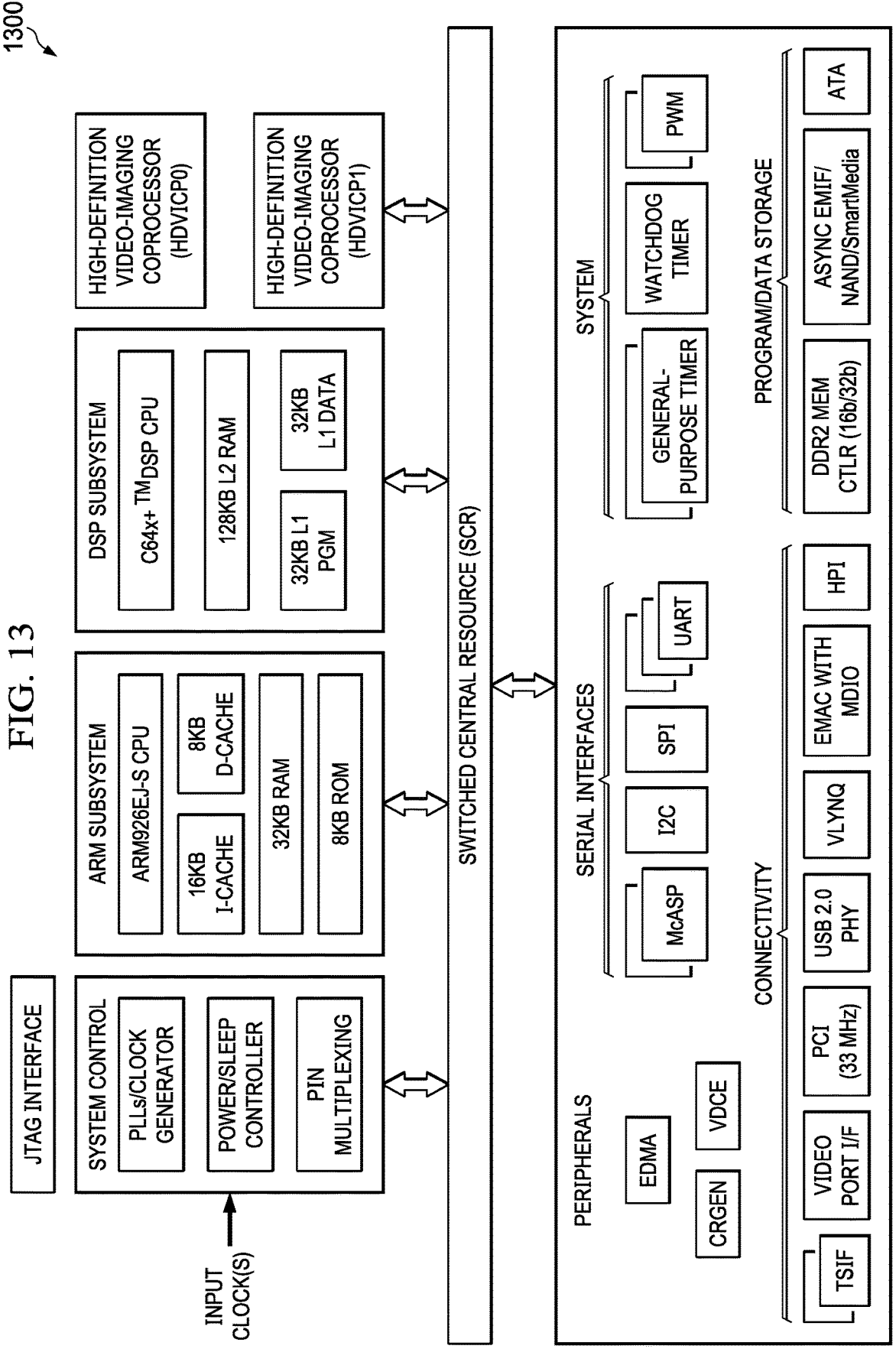
FIG. 13 is a block diagram of an illustrative digital system.

FIG. 13 is a block diagram of an example digital system suitable for use as an embedded system that may be configured to perform CU partitioning and fast motion estimation as described herein during encoding of a video stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1300 is a programmable platform designed to meet the processing needs of applications such as video encode/decode/transcode/transrate, video surveillance, video conferencing, set-top box, medical imaging, media server, gaming, digital signage, etc. The SoC 1300 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1300 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1300, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1300 also includes application-specific hardware logic, on-chip memory, and additional on-chip peripherals.

The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 13, the SoC 1300 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1300 may be configured to perform CU partitioning and fast motion estimation during video encoding using methods described herein. For example, the coding control of the video encoder of FIG. 7 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. Entropy encoding on the HDVICP coprocessors may signal the selected CU partitioning into the encoded bit stream.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, one of ordinary skill in the art will appreciate embodiments in which an embodiment of the fast motion estimation technique described herein is used in the bottom up CU partitioning of FIG. 3.

In another example, embodiments have been described herein assuming that the PU partition types are those of FIG. 10. One of ordinary skill of the art will understand embodiments of the invention that use fewer PU partition types, more partition types, and differing partition types. The specified PU partition types for a CU size and/or for inter and intra-prediction may also differ from what is shown in FIG. 10. For example, in some embodiments, the N×N PU partition type may be used for one or more CU sizes other than the smallest CU size for inter-prediction and/or intra-prediction. In another example, in some embodiments, the 2N×N and N×2N partition types may be used for one or more CU sizes for intra-prediction.

In another example, embodiments have been described in which both forward and backward motion vectors are determined for a PU. One of ordinary skill in the art will understand embodiments in which a single motion vector is determined for a PU.

In another example, embodiments of a fast motion estimation technique have been described herein in which the motion search used to refine a predictor is less complex than the motion search used to determine motion vectors for a CU of the smallest size. One of ordinary skill in the art will understand embodiments in which the same motion search is used for refining a predictor and determining the motion vectors for a smallest CU. For example, a three step search may be used for both.

In another example, embodiments have been described assuming the HEVC inter-prediction and Intra-prediction modes. One of ordinary skill in the art will appreciate embodiments in which the inter-prediction and intra-prediction modes are different from those defined in HEVC, e.g., HEVC Draft 7.

In another example, embodiments have been described assuming quadtree partitioning of the coding unit hierarchy. One of ordinary skill in the art will appreciate embodiments in which a different partitioning of the coding unit hierarchy is used.

Embodiments of the methods and encoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method comprising:
   receiving, by one or more processors, a video data that includes a largest coding unit (LCU);
   performing, by the one or more processors, intra-prediction on each coding unit (CU) of the LCU beginning with a smallest size CU to determine an intra-prediction coding cost for each of the CUs;
   performing, by the one or more processors, inter-prediction on each CU of the LCU beginning with the smallest size CU to determine an inter-prediction coding cost for each of the CUs;
   selecting, by the one or more processors, a best prediction mode for each CU of the LCU based on the inter-prediction coding cost for each of the CUs and the intraprediction coding cost for each of the CUs;
   determining, by the one or more processors, whether a current CU is a parent CU; and in response to determining the current CU is the parent CU, selecting, by the one or more processors, a CU partition.

2. The method of claim 1, further comprising:
determining, by the one or more processors, a size of each CU of the LCU.

3. The method of claim 2, wherein:
the size of each CU of the LCU is based on a predetermined LCU size.

4. The method of claim 2, wherein:
the size of each CU of the LCU is based on a predetermined CU hierarchy depth.

5. The method of claim 1, further comprising:
determining, by the one or more processors, a summed coding cost of child CUs.

6. The method of claim 5, further comprising:
determining, by the one or more processors, a coding cost of the parent CU.

7. The method of claim 6, wherein:
the selecting the CU partition is made by selecting the CU partition having a smallest coding cost based on a comparison of the summed coding cost of child CUs and the coding cost of the parent CU.

8. A system comprising:
one or more processors configured to:
receive a video data that includes a largest coding unit (LCU);
perform intra-prediction on each coding unit (CU) of the LCU beginning with a smallest size CU to determine an intra-prediction coding cost for each of the CUs;
perform inter-prediction on each CU of the LCU beginning with the smallest size CU to determine an inter-prediction coding cost for each of the CUs;
select a best prediction mode for each CU of the LCU based on the interprediction coding cost for each of the CUs and the intra-prediction coding cost for each of the CUS;
determine whether a current CU is a parent CU; and
in response to determining the current CU is the parent CU, select a CU partition.

9. The system of claim 8, wherein the one or more processors is further configured to:
determine a size of each CU of the LCU.

10. The system of claim 9, wherein:
the size of each CU of the LCU is based on a predetermined LCU size.

11. The system of claim 9, wherein:
the size of each CU of the LCU is based on a predetermined CU hierarchy depth.

12. The system of claim 8, wherein the one or more processors is further configured to:
determine a summed coding cost of child CUs.

13. The system of claim 12, wherein the one or more processors is further configured to:
determine a coding cost of the parent CU.

14. The system of claim 13, wherein:
the selecting the CU partition is made by selecting the CU partition having a smallest coding cost based on a comparison of the summed coding cost of child CUs and the coding cost of the parent CU.

15. A non-transitory computer readable medium storing software instructions that when executed in a digital system cause the digital system to perform a method for motion estimation as part of encoding a video stream, the method comprising:
receiving a video data that includes a largest coding unit (LCU);
performing intra-prediction on each coding unit (CU) of the LCU beginning with a smallest size CU to determine an intra-prediction coding cost for each of the CUs;
performing inter-prediction on each CU of the LCU beginning with the smallest size CU to determine an inter-prediction coding cost for each of the CUs;
selecting a best prediction mode for each CU of the LCU based on the inter-prediction coding cost for each of the CUs and the intra-prediction coding cost for each of the CUS;
determining whether a current CU is a parent CU; and
in response to determining the current CU is the parent CU, selecting a CU partition.

16. The non-transitory computer readable medium of claim 15, wherein the method further comprises:
determining a size of each CU of the LCU.

17. The non-transitory computer readable medium of claim 16, wherein:
the size of each CU of the LCU is based on a predetermined LCU size and a predetermined CU hierarchy depth.

18. The non-transitory computer readable medium of claim 15, wherein the method further comprises:
determining a summed coding cost of child CUs.

19. The non-transitory computer readable medium of claim 18, wherein the method further comprises:
determining a coding cost of the parent CU.

20. The non-transitory computer readable medium of claim 19, wherein:
the selecting the CU partition is made by selecting the CU partition having a smallest coding cost based on a comparison of the summed coding cost of child CUs and the coding cost of the parent CU.

* * * * *